United States Patent [19]

Coussens et al.

[11] Patent Number: 5,761,661
[45] Date of Patent: Jun. 2, 1998

[54] DATA MANAGEMENT SYSTEM AND METHOD

[75] Inventors: Brent B. Coussens, Tulsa; Cindy L. Birney, Broken Arrow, both of Okla.

[73] Assignee: The Sabre Group, Inc., Dallas/Forth Worth, Tex.

[21] Appl. No.: 577,847

[22] Filed: Jul. 14, 1994

Related U.S. Application Data

[63] Continuation of Ser. No. 275,296, Jul. 14, 1994, abandoned.

[51] Int. Cl.$^6$ .................................................. G06F 17/30
[52] U.S. Cl. ...................... 707/9; 707/10; 707/2; 707/3; 707/4; 705/37; 705/26; 345/326; 345/340; 345/352
[58] Field of Search ........................ 395/600, 575, 395/650; 364/408; 707/2, 3, 4, 10, 9; 705/37, 26; 345/326, 348, 352

[56] References Cited

U.S. PATENT DOCUMENTS

| | | | |
|---|---|---|---|
| 4,972,318 | 11/1990 | Brown et al. | 364/403 |
| 5,003,473 | 3/1991 | Richards | 364/408 |
| 5,063,507 | 11/1991 | Lindsey et al. | 364/408 |
| 5,262,942 | 11/1993 | Earle | 364/408 |
| 5,274,547 | 12/1993 | Zoffel et al. | 364/408 |
| 5,285,383 | 2/1994 | Lindsey et al. | 364/408 |
| 5,393,965 | 2/1995 | Bravman et al. | 235/383 |
| 5,485,369 | 1/1996 | Nicholls et al. | 364/401 |
| 5,530,852 | 6/1996 | Meske, Jr. et al. | 395/600 |

*Primary Examiner*—Thomas G. Black
*Assistant Examiner*—Cheryl R. Lewis
*Attorney, Agent, or Firm*—Finnegan, Henderson, Farabow, Garrett & Dunner, L.L.P.

[57] ABSTRACT

The present invention consists of a data management system having a centrally located host computer, at least one trading partner output data file that communicates with the host computer, a data management processing means resident within the host computer and in communication with the trading partner's output data file, at least one management transaction database in communication with the processing means, at least one management customer database in communication with the data management processing means and at least one data output means within the host computer that provides visual representation of the data following processing from the management transaction database, the management customer database, and the output data file.

4 Claims, 10 Drawing Sheets

```
  View  Exit  Help
------------- DI-MATE Manage Trading Partners ----------------DMI002
  OPTION  ===>

1)  View Trading Partner Profile
          2)  Update Trading Partner Profile
          3)  Add/Copy A Trading Partner Profile
          4)  View Trading Partner Point of Contact
          5)  Update Trading Partner Point of Contact
          6)  Add A Point of Contact for a Trading Partner
          7)  View All Map IDs for a Trading Partner
          8)  View Trading Partner Map ID Profile Enter Search Criteria If Desired Trading Partner Name      :
         Trading Partner Nickname  :
         Point of Contact Name     :
         Map ID                    :

F1=Help F3=Return
```

*Fig. 4*

```
View  Exit  Help
---------- DI-MATE Query Trading Partners ----------   DMI015
OPTION  ===>

View all Trading Partners:

1)  In Alphabetical Order
            2)  By Transaction ID/Direction
            3)  By Network ID
            4)  By Map ID And Test/Production Status Enter Search Criteria as Desired Trading Partner Name :                    Direction :   (R/S/ )
  Transaction ID       :                    Test/Prod :   (T/P/ )
  Network ID           :
  Map ID               :

-----------------------------------------------------------------
F1=Help  F3=Return
```

Fig.5

```
View  Exit  Help
------------ DI-MATE Monitor Transaction Activity ------------------DMI022

OPTION  ===>              View Transaction Activity:

1) By Date Only
                       2) Trading Partner By Date
                       3) Transaction ID and Direction By Date
                       4) Document Number By Date
                       5) Transaction Status By Date
                       6) Control Numbers By Date Enter Search Criteria If Desired Start Date (MM/DD/YYYY)  :              End Date (MM/DD/YYYY) :
Trading Partner Name     :
Trading Partner Nickname :
Transaction ID           :              Direction    (R,S)   :
Document Number          :
Transaction Status       :
                                                    Trans :
Interchg :              Group :    Control Numbers F1=Help  F3=Return
```

Fig.6

```
View  Exit  Help
------------- DI-MATE Display EDI Statistics -------------DMI035
OPTION  ===>

1)  View Volume Information by Date
        2)  View Volume Information by Document ID
        3)  View Volume Information by Trading Partner
        4)  View Volume Information by Transaction
        5)  View Transaction Activity Graph by Trading Partner Enter Search Criteria If Desired Start Date (MM/DD/YYYY) :                End Date (MM/DD/YYYY) :
Document ID             :
Trading Partner Name    :
Trading Partner Nickname:
Transaction ID          :                Direction        (S,R) :

F1=Help  F3=Return
```

Fig. 7

DATA MANAGEMENT SYSTEM AND METHOD

This application is a continuation of application Ser. No. 08/275,296, filed Jul. 14, 1994 now abandoned.

TECHNICAL FIELD

This invention relates in general to a data management system and method and in particular to a data management system and method used in connection with an electronic data interchange system for processing of various data files and producing a visual presentation of that data following processing.

BACKGROUND OF THE INVENTION

Electronic data interchange ("EDI") is, in essence, the flow of information between organizations without human intervention. EDI uses standardized structured electronic "transaction sets" or "messages" to replace paper or verbal exchanges. Hundreds of such transaction sets are used by thousands of companies around the world. EDI eliminates the expense, errors and delays associated with human processing of business information. The use of EDI helps companies reduce inventory, free up working capital, increase productivity and cut cycle times. Even more importantly, by reducing human intervention EDI allows organizations to more highly automate the decision making process. This reduces labor costs and also frees up people to manage the business processes more effectively and to handle exceptions that may arise. Thus, EDI has become extremely widespread and used in both product and service oriented industries.

While the early uses of EDI were largely in the manufacturing, distribution and transportation industries, EDI systems are now rapidly establishing themselves in service industries such as payroll, banking, insurance and health care. While the use of current EDI systems has become commonplace, the present invention enhances prior EDI systems by successfully and efficiently augmenting EDI databases, customizing customer profiles, and in general, allowing optimal efficiency in the use of EDI systems in the workplace today.

Currently, EDI systems are offered by multitudes of companies including Advantis, American Business Computer, Digital Equipment Corp., EDS Solutions, Inc., GE Information Services and others. None of the current EDI systems, however, allow the rapid processing and customization of data and the ability to track transactions as does the present invention. The present invention provides a more efficient tracking and management of data relating to EDI trading partners and the transactions between them.

Prior available systems include those disclosed in U.S. Pat. No. 3,956,739. The '739 patent discloses a business machine for communicating with remote or local data devices, a multiplex that selects the device to communicate with the business machine and sequences the operation through several steps under the control of a central processing unit.

U.S. Pat. No. 4,348,739 discloses a data communication system including a terminal, printer, display and memory and allows data exchange via communication systems.

U.S. Pat. No. 4,799,156 discloses an interactive on-line communication system for processing business transactions pertaining to a plurality of types of independent users in the financial and trade services area.

U.S. Pat. No. 4,852,000 discloses a system for maintaining business records, including a main menu having a plurality of modular expense routines and a plurality of modular operational system routines.

U.S. Pat. No. 4,951,196 discloses a system and method for performing an electronic data interchange among a variety of trading partners. The system can define, enter and translate business transaction data in a variety of different dictionary structure formats.

U.S. Pat. No. 4,994,964 discloses a data processing system that monitors client business records over time and utilizes predetermined criteria to determine the client's vested interest in funds deposited into special client accounts.

U.S. Pat. No. 5,051,891 discloses a system allowing interactive information handling that manages a relatively large number of electronic documents and users.

U.S. Pat. No. 5,202,977 discloses a language based electronic data interchange translation system providing the capability of receiving data from a first format source, execute a script to translate the data to a second format and transmit the data in the second format to a destination. This system described in the '977 patent employs a data tree structured to enable flexible translation between EDI documents and application documents with differing data structures.

None of the prior EDI systems, however, disclose the flexibility and efficient ability to track, manage and supplement between trading partners data as does the present invention.

SUMMARY OF THE INVENTION

The present invention is a data interchange management system that allows the tracking and management of electronic data interchange partners and their related transactions. The present invention provides current trading partner information pulled directly from that trading partner's output files as well as displaying the current transaction from that partner. In addition, the present invention tracks the transactions for every trading partner. In one embodiment, the present invention consists of a data management system having a centrally located host computer, at least one trading partner output data file that communicates with the host computer, a data management processing means resident within the host computer and in communication with the trading partner's output data file, at least one management transaction database in communication with the processing means, at least one management customer database in communication with the data management processing means and at least one data output means within the host computer that provides visual representation of the data following processing from the management transaction database, the management customer database, and the output data file.

In addition the present invention provides a method of use for the end user that consists of the steps of (a) selecting at least one of a plurality of processing menus, (b) selecting at least one of a plurality of processing options within the processing menu selected, (c) entering at least one of a plurality of commands to initiate the processing of the data, (d) processing the data based on the commands entered, (e) entering at least of the plurality of commands for selecting an output option, (f) entering at least one of a plurality of commands for providing a visual presentation based on the selected output option and (g) providing the visual presentation based on the command selected. Thus, the present invention provides numerous advantages over the prior EDI systems.

BRIEF DESCRIPTION OF THE INVENTION

Other aspects of the invention and its advantages may be appreciated with reference to the following detailed description taken in conjunction with the appended drawings in which:

FIG. 4 is a representative screen of one of the preferred embodiments of the invention relating to the trading partner profile menu;

FIG. 5 is a representative screen of one of the preferred embodiments of the invention relating to the trading transaction menu;

FIG. 6 is a representative screen of one of the preferred embodiments of the invention relating to the transaction activity menu;

FIG. 7 is a representative screen of one of the preferred embodiments of the invention relating to the statistics menu;

DETAILED DESCRIPTION OF THE INVENTION

Figure 1:
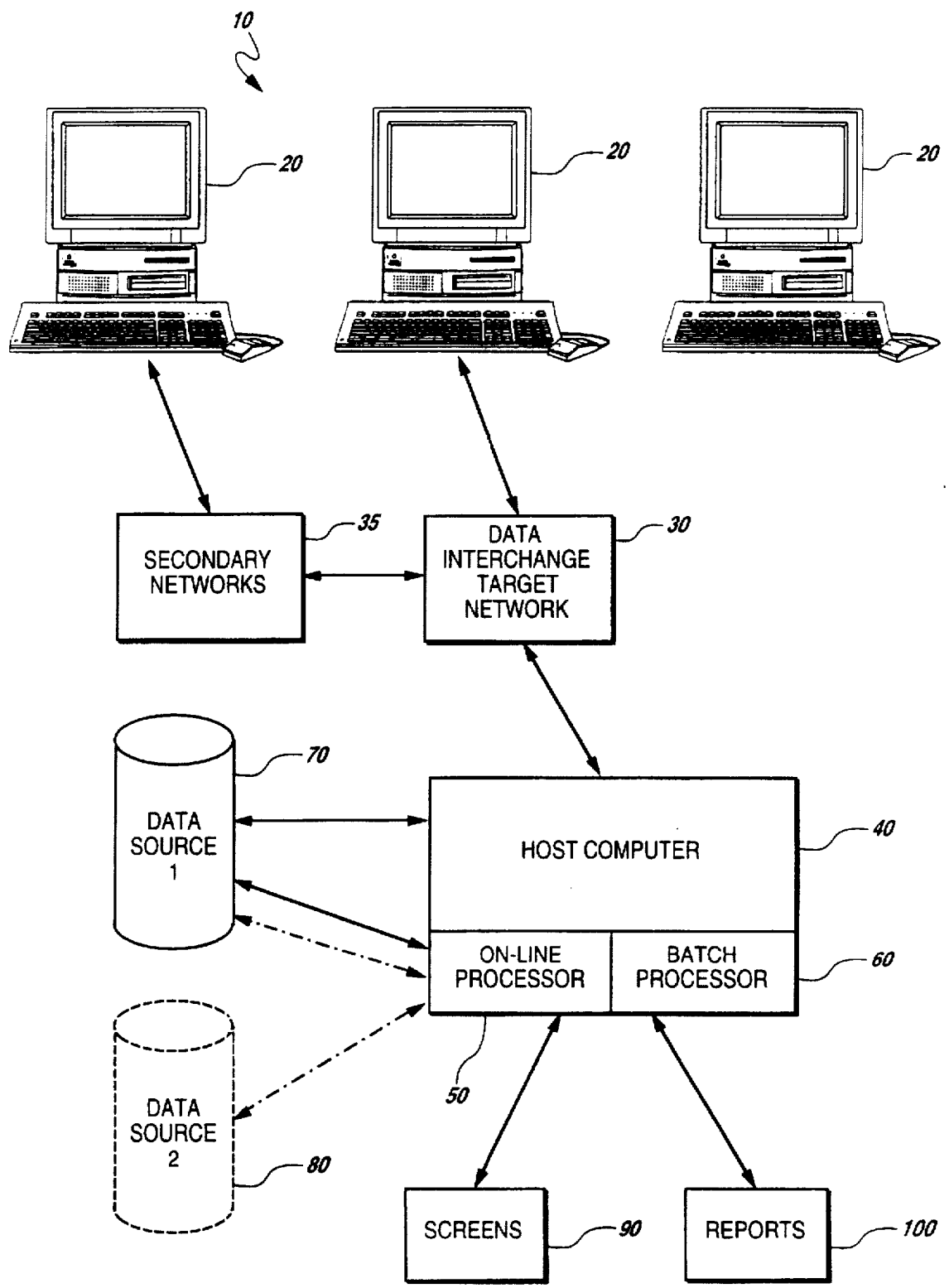
FIG. 1 is a schematic flow chart of the data management system.

Referring now to FIG. 1, therein is disclosed the system 10 including a plurality of trading partners 20. Trading partners 20 are customers who use electronic data interchange ("EDI") in order to transfer information relating to certain transactions between themselves and vendors, customers, clients or other EDI partners. Note that the trading partners 20 communicate with a data interchange target network 30 which in turn may communicate with various other secondary networks 35. The data interchange target network 30 and the secondary networks 35 are standard network systems customary in the industry.

The data interchange network 30 communicates with a host computer 40 and, thus, provides a link to the trading partner. Resident within the host computer 40 are various processors including an on-line processor 50 and batch processor 60. It should be clearly understood that the system 10 allows for both on-line processing and batch processing of data from the trading partners 20 and other data sources. The host computer 40 may communicate with multiple data sources 70 and 80 which contain data in separate databases from that of the data interchange target network 30 and are capable of providing supplementary data and transaction information relating to the trading partners 20. Upon suitable processing of the data received from the data interchange target network 30 by the on-line processor 50 and batch processor 60 within the host computer 40, various output means can be utilized to provide on-line screens for displaying the data 90 or to print various reports 100 after processing of the data.

Figure 1A:
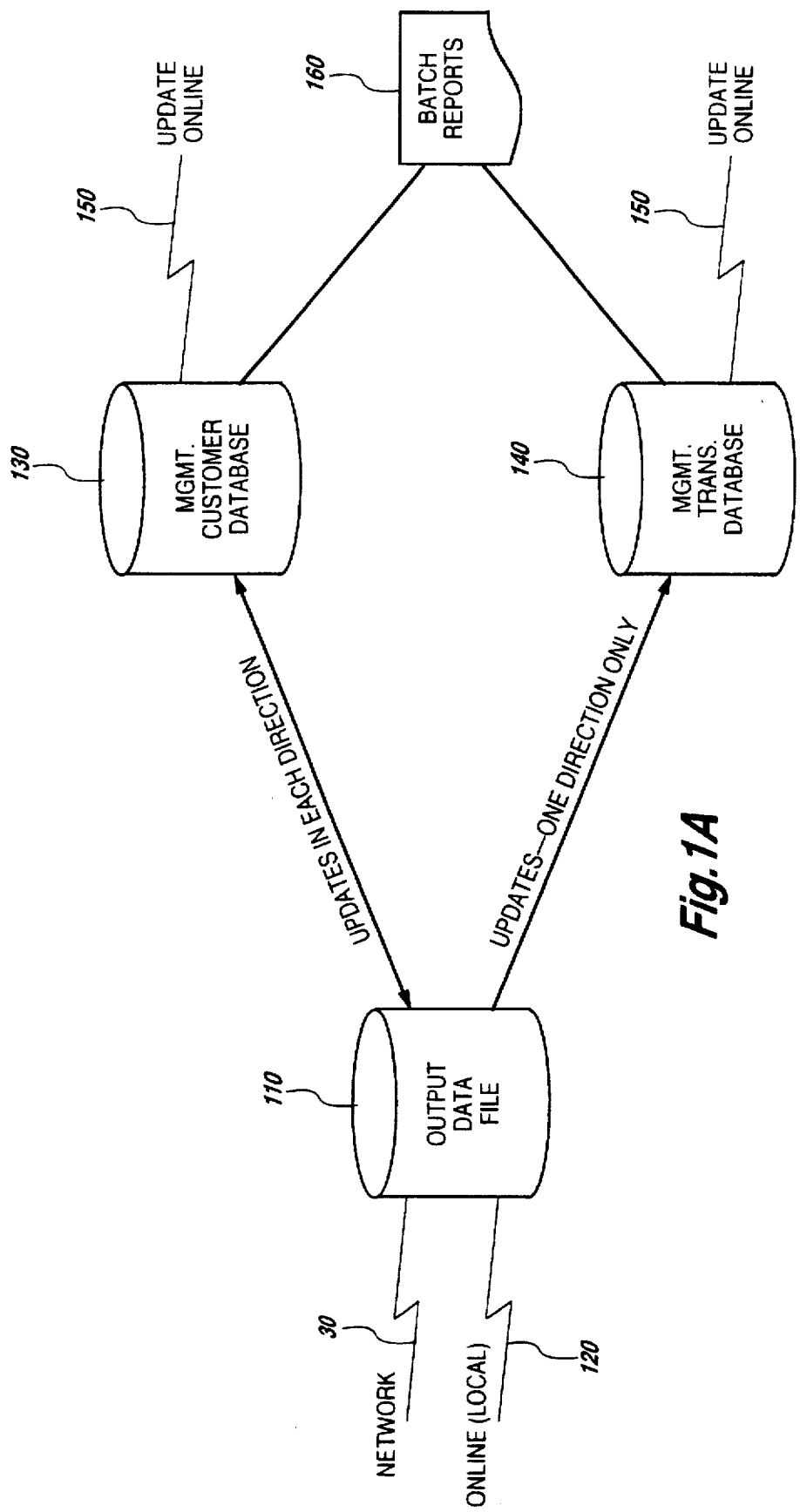
FIG. 1a is a schematic flow chart of the interaction between a trading partner output file and the data management system.

Referring now to FIG. 1a, a data output file 110 communicates with the data interchange target network 30 or to local on-line networks 120. The output data file 110 typically is resident within the host computer 40 or the data interchange target network 30 and contains trading partners 20 data. In one preferred embodiment, data source 70 and data source 80 are a management customer database 130 and a management transaction database 140, respectively. The management transaction database 140 receives information from the output data file 110 only and does not reciprocate by sending data to the output data file 110. The management customer database 130, however, both receives and sends data to the output data file 110 and subsequently to the data interchange target network 30 and to the trading partners 20.

Also referred to in FIG. 1a is the update on-line communications 150 from the management customer database 130 and management transaction database 140. The on-line communications update 150 provides current customer and transaction information in an on-line, end user environment. Databases 130 and 140 also use batch processor 60 of the host computer 40 to format batch reports 160. The batch reports 160 are also used for various transaction activities of the present invention.

Figure 2:
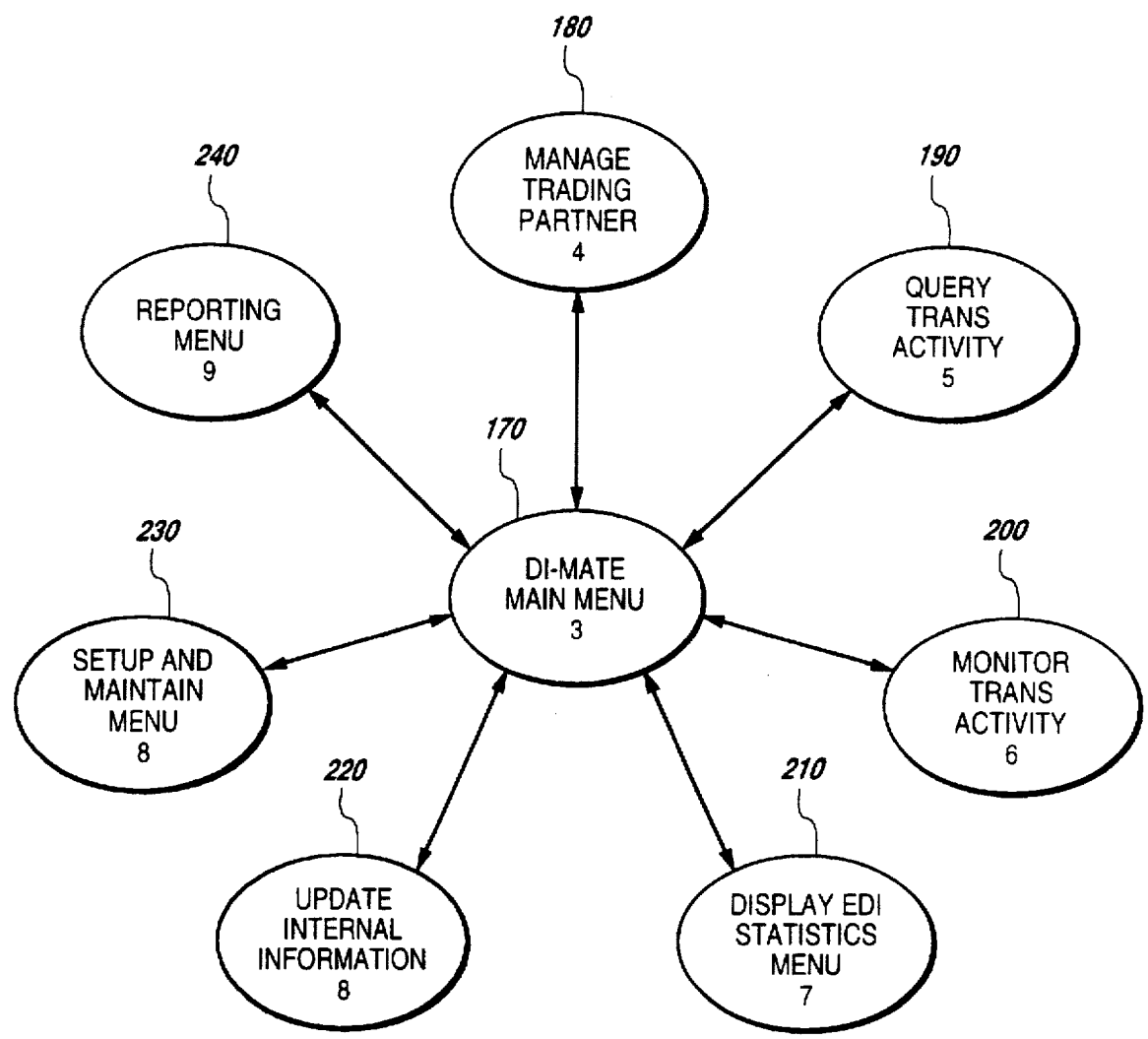
FIG. 2 is a schematic of several of the menus within one of the preferred embodiments of the invention.

Turning now to FIG. 2, the main process menu 170, in one preferred embodiment of the invention of the data management system 10, has a plurality of menus that may be selected by the end user. These include a manage trading partner menu 180, a query trading partner menu 190, a monitor transaction activity menu 200, a display EDI statistics menu 210, an update internal information menu 220, set-up and maintain menu 230 and a reporting menu 240. Other menus than those disclosed in FIG. 2 may obviously be included without departing from the spirit or scope of the invention.

Figure 3:
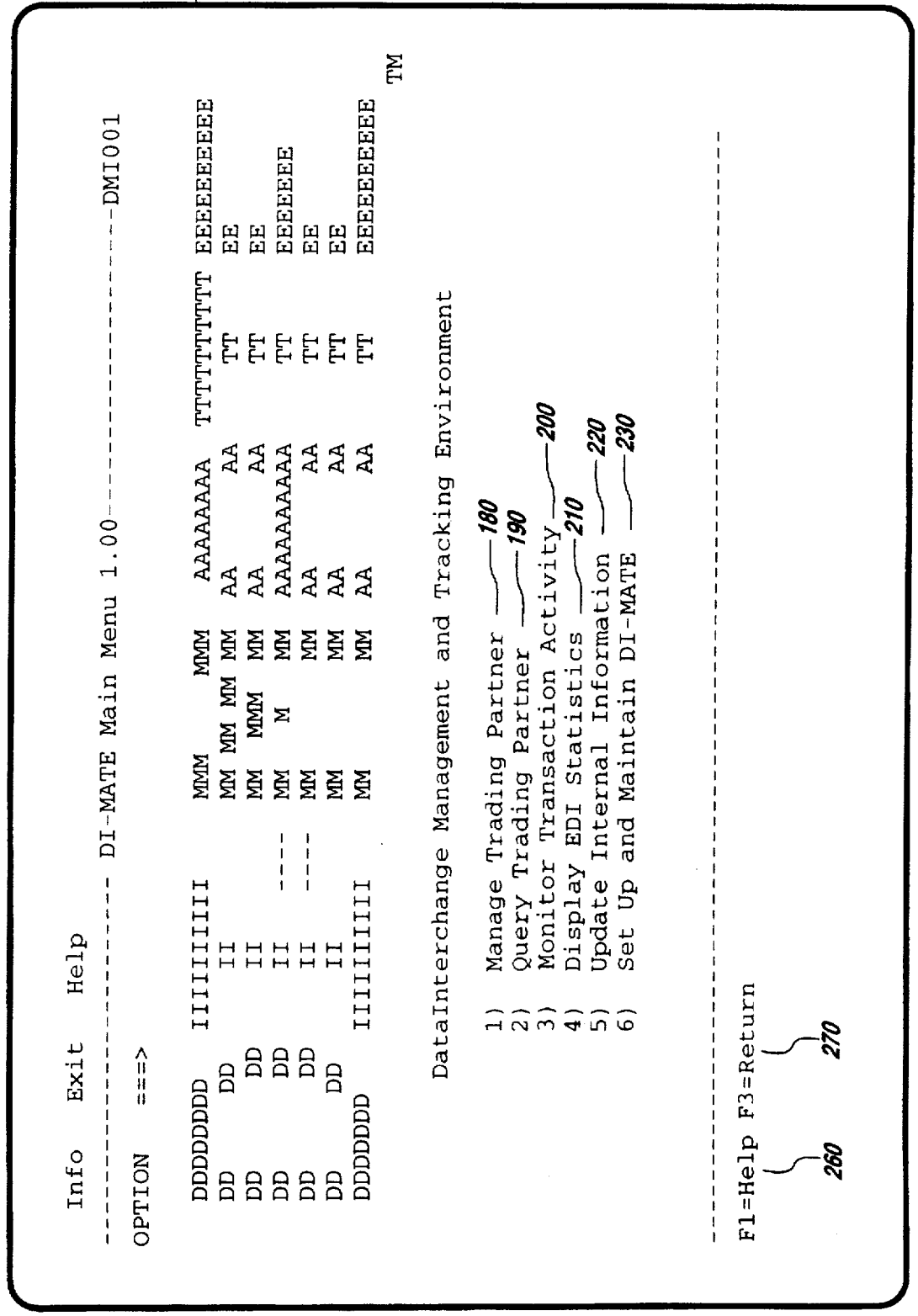
FIG. 3 is a representative screen of one of the preferred embodiments of the invention relating to the main menu options.

Turning to FIG. 3, illustrated therein shown is an initial screen 250 of one preferred embodiment of the data management system 10. The initial screen 250 shows the main menu 170 options disclosed in FIG. 2 including the options for selecting the manage trading partner menu 180, query partner menu 190, monitor transaction activity menu 200, display EDI statistics menu 210, update internal information menu 220 and set-up and maintain menu 230. Note also that there are help and return functions 260 and 270 within the initial screen 250. In using the system 10, once the screen 250 is displayed, the end user selects one of the various menus 180–230 by entering the commands 1 through 6.

Turning to FIG. 4, therein is shown the manage trading partner screen 280 which is displayed when the option for the menu 180 is selected. The manage trading partner menu screen 280 displays eight options for the end user to select including: 1) view trading partner profiles, 2) update trading partner profiles, 3) add/copy trading partners, 4) view trading partner point of contacts, 5) update trading partner point of contacts, 6) add a point of contact for trading partner, 7) view all map IDs for a trading partner, and 8) view trading partner map ID profiles. The end user may select any of the options by entering commands 1 through 8.

In addition, screen 280 has space for entering information such as trading partner names, point of contact names, point of contact type, and map ID. Help and return functions are also options within screen 280.

Turning to FIG. 5, therein is shown the query trading partner screen 290 which is displayed when the option for menu 190 is selected. The query trading partner screen 290 includes the ability to view all trading partners by 1) alphabetical order, 2) by transaction ID/direction, 3) by network ID and 4) by MAP ID and test/production status. The end user may select any of these options by entering commands 1 through 4.

In addition, screen 290 also has the options for help and return through the use of PF keys.

Turning now to FIG. 6, therein is shown the view transaction activity screen 300 which is displayed when the option for menu 200 is selected. Options within the transaction activity screen 300 include the ability to 1) by date only, 2) by trading partner by date, 3) by a transaction ID and direction by date, 4) by document number by date, 5) by transaction status by date and 6) by control numbers by date. In addition, screen 300 also includes the help, return, and main menu functions. The end user may select any of these options by entering commands 1 through 6.

Turning to FIG. 7, therein disclosed is display statistics menu screen 310 which is displayed when the option for menu 210 is selected. Screen 310 includes the ability to display 1) volume information by date, 2) by document ID, 3) by trading partner by date, 4) by transaction by date and 5) transaction activity graph by trading partner. Screen 310 also has help and return. The end user may select any of these options by entering commands 1 through 5.

Figure 8:
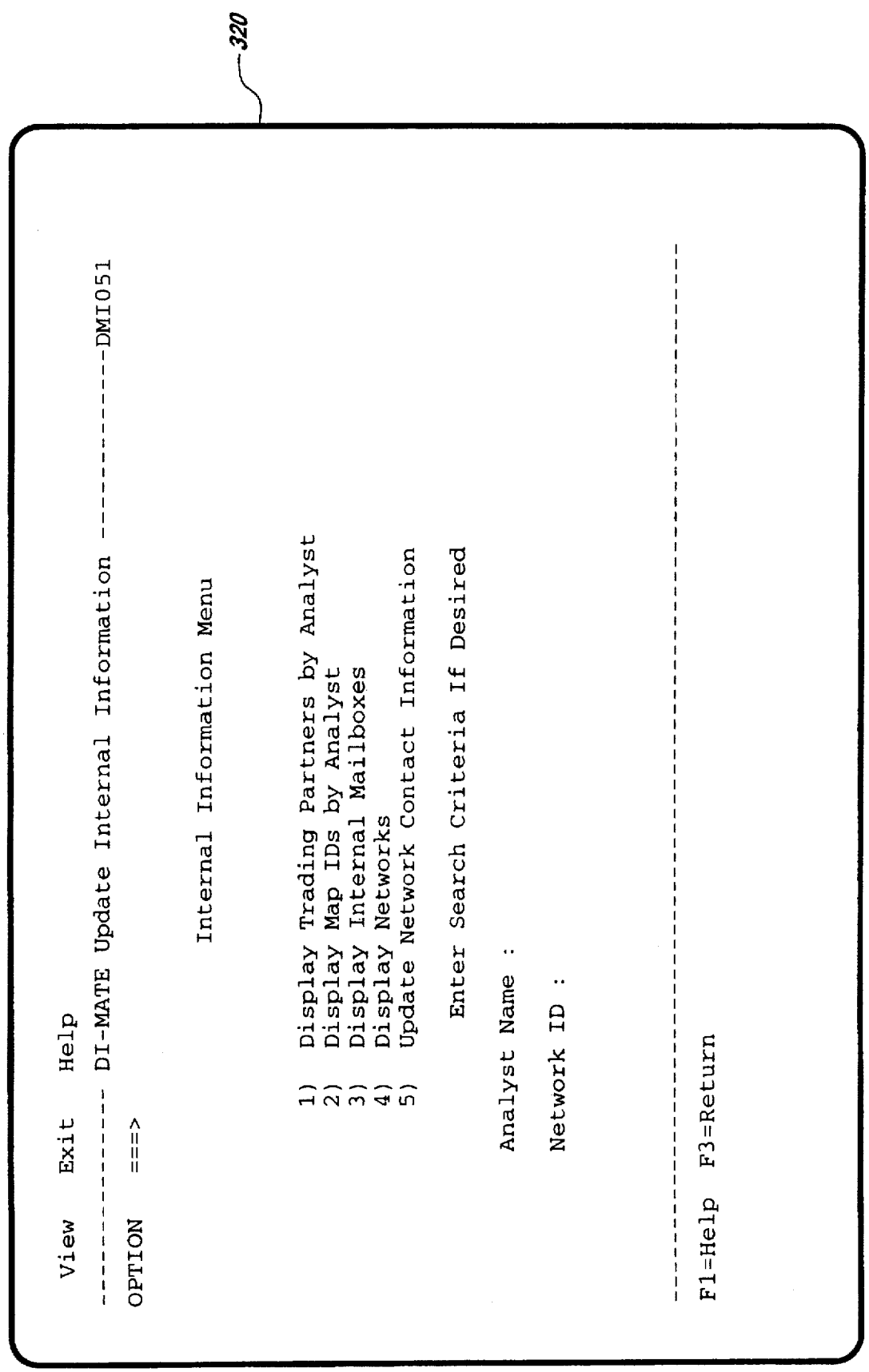
FIG. 8 is a representative screen of one of the preferred embodiments of the invention relating to the internal information menu.

Turning now to FIG. 8, therein is shown the internal information screen 320 which is displayed when the option for the menu 220 is selected. Options within screen 320 include the ability to 1) display by trading partner by analyst, 2) display MAP ID by analyst, 3) display internal mailboxes, 4) display networks and 5) update network contact information. Screen 320 also includes help and return PF keys. The end user may select any of these options by entering commands 1 through 5.

Figure 9:
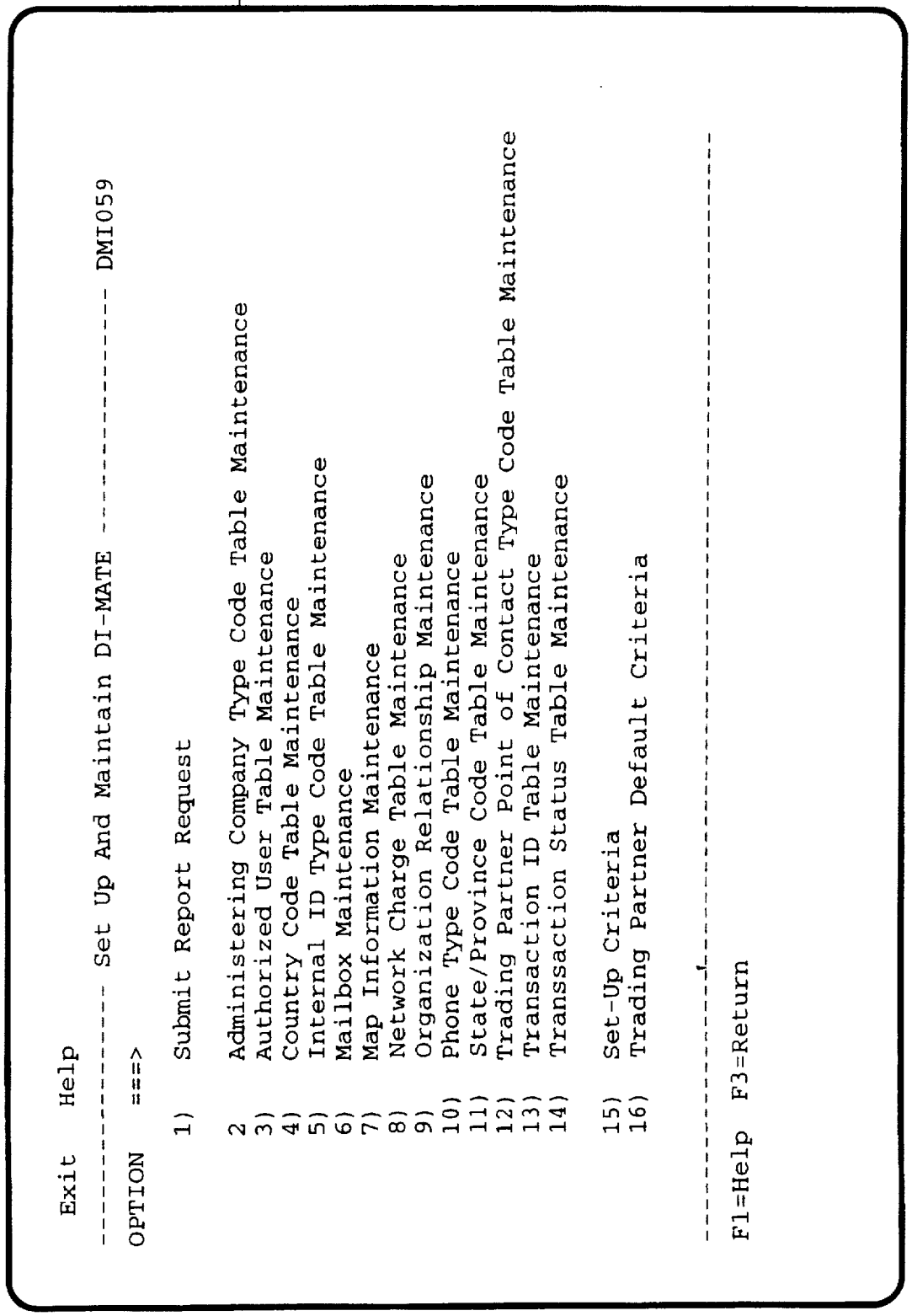
FIG. 9 is a representative screen of one of the preferred embodiments of the invention relating to the administrative function menu.

Turning now to FIG. 9, therein is shown the set-up and maintain screen 330 which is displayed when the option for menu 230 is selected. Screen 330 provides the end user with options to 1) submit report request, 2) administer company type code table maintenance, 3) authorize user table maintenance, 4) country code table maintenance, 5) internal ID type code table maintenance, 6) mailbox maintenance, 7) map information maintenance, 8) network charge table maintenance, 9) organization relationship maintenance, 10) phone type code table maintenance, 11) state/province code table maintenance, 12) trading partner point of contact type code table maintenance, 13) transaction ID table maintenance, 14) transaction status table maintenance, 15) set-up criteria and 16) trading partner default criteria. Screen 330 also has help and return PF keys as well. The end user may select any of these options by entering commands 1 through 16.

In one preferred embodiment of the invention system 10, several batch jobs make up the maintenance and reporting side of the present invention. Following is a brief description of the batch jobs used in one preferred embodiment of the invention:

DMI002—Moves transaction activity from the system 10 transaction activity table to the system 10 history table based on the default criteria entered via the on-line screens.

DMI003—Moves transaction activity from the system 10 transaction history table to a tape backup based on the default criteria entered via the on-line screens.

DMI004—Load program that reads the trading partners 20 profile file and loads the system 10 requester profiles, network ids, and trading partner profiles.

DMI005—Loads the map ids from trading partners 20 into system 10.

DMI006—Compares the trading partners 20 Profile file to database 130 and 140 tables.

DMI007—Compares the trading partners 20 Map information to the Map information and profiles stored in the system 10 and keeps these tables in sync.

DMI008—Extracts transactions from trading partners 20 that have been functionally acknowledged or marked to roll off due to the date. Removes the transactions from trading partners 20 and loads them into system 10. In addition, DMI008 updates the last transmission information for trading partners and map ids.

DMI009—Purges trading partners and all map ids, points of contact, note logs, statistics, and transactions associated with any trading partners with a deletion flag set to Y and a deletion date less than current date. The deletion flag is set to Y via the on-line Trading Partner Update screen and the deletion date less than current date. The deletion flag is set to Y via the on-line Trading Partner Update screen and the deletion date is set when the flag is set to Y. The deletion date is set to current date plus number of days before deletion occurs value set in the default criteria entered via the on-line screen (Options 15 from the Set Up and Maintain system 10 Menu). Also when a trading partner is deleted within DataInterchange, the flag is set to Y for that trading partner within system 10 and the deletion date is set. This job should be run weekly.

DMI010—Updates statistics in system 10. Keeps a cumulative total by trading partner and mapid in addition to monthly totals. This job can be run nightly or be requested via the on-line screen Submit Report Request (Option 1 from the Set Up and Maintain system 10 Menu). DMI010 should NOT be run twice in the same day. Should run after job DMI008.

DMI012—Retrieves transaction activity that has been backed up to tape and puts it back to the transaction activity history file. This job can be requested to run via the on-line screen Submit Report Request (Option 1 from the Set Up and Maintain system 10 Menu). DMI012 should only be requested when you need to retrieve transaction activity.

DMI013—Generates report DMI002—Trading Partners with associated Points of Contact. This report can be requested via the on-line screen Submit Report Request (Option 1 from the Set Up and Maintain system 10 Menu). The data will be taken from the extract file created in job DMI025, so to obtain the most current data, the extract must run prior to this job.

DMI014—Generates report DMI003—Trading Partners with agreements. This report can be requested via the on-line screen Submit Report Request (Option 1 from the Set Up and Maintain system 10 Menu). The data will be taken from the extract file created in job DMI025, so to obtain the most current data, the extract must run prior to this job.

DMI015—Generates report DMI004—Trading Partners without agreements. This report can be requested via the on-line screen Submit Report Request (Option 1 from the Set Up and Maintain system 10 Menu). The data will be taken from the extract file created in job DMI025, so to obtain the most current data, the extract must run prior to this job.

DMI016—Generates report DMI005—Trading Partners by Network. This report can be requested via the on-line screen Submit Report Request (Option 1 from the Set Up and Maintain system 10 Menu). The data will be taken from the extract file created in job DMI025, so to obtain the most current data, the extract must run prior to this job.

DMI017—Generates report DMI001—Trading Partners Added or Deleted. This report can be requested via the on-line screen Submit Report Request (Option 1 from the Set Up and Maintain system 10 Menu). The data will be taken from the extract file created in job DMI025, so to obtain the most current data, the extract must run prior to this job.

DMI019—Generates report DMI006—Trading Partners with associated transaction sets and map ids. This report can be requested via the on-line screen Submit Report Request (Option 1 from the Set Up and Maintain system 10 Menu). The data will be taken from the extract file created in job DMI025, so to obtain the most current data, the extract must run prior to this job.

DMI020—Generates report DMI007—Receive Transactions with errors. This report can be requested via the on-line screen Submit Report Request (Option 1 from the Set Up and Maintain system 10 Menu). The data will be taken from the extract file created in job DMI024, so to obtain the most current data, the extract must run prior to this job.

DMI021—Generates report DMI008—Send Transactions with Errors. This report can be requested via the on-line screen Submit Report Request (Option 1 from the Set Up and Maintain system 10 Menu). The data will be taken from the extract file created in job DMI024, so to obtain the most current data, the extract must run prior to this job.

DMI022—Generates report DMI009—Functional Acknowledgements Sent to a Trading Partner by Date. This report can be requested via the on-line screen Submit Report Request (Option 1 from the Set Up and Maintain system 10 Menu). The data will be taken from the extract file created in job DMI024, so to obtain the most current data, the extract must run prior to this job.

DMI023—Generates report DMI010—Trading Partners listed Alphabetically. This report can be requested via the on-line screen Submit Report Request (Option 1 from the Set Up and Maintain system 10 Menu). The data will be taken from the extract file created in job DMI024, so to obtain the most current data, the extract must run prior to this job.

DMI024—Extracts trading partner and transaction information from the system 10 DB2 tables to be used for generating reports. This job can be run nightly or requested via the on-line screen Submit Report Request (Option 1 from the Set Up and Maintain system 10 Menu). If DMI024 is run nightly, it must run after jobs DMI006 and DMI007.

DMI025—Extracts trading partner information from the system 10 DB2 tables to be used for generating reports. This job can be run nightly or requested via the on-line screen Submit Report Request (Option 1 from the Set Up and Maintain system 10 Menu). If DMI025 is run nightly, it must run after jobs DMI006 and DMI007.

DMI111 - Copy Transaction Activity to History
DMI112 - Copy History Activity to Tape
DMI113 - Load trading partners 20 Profile Data to System 10 Tables
DMI114 - Load trading partners 20 Data to system 10 DB2 Tables
DMI115 - Compare trading partners 20 Profile Data to system 10 Tables to keep consistent
DMI116 - Compare trading partners 20 Data to system 10 DB2 Data to keep consistent
DMI117 - Transaction Activity Extract from trading partners 20 TO system 10
DMI122 - Trading Partner Purge
DMI123 - Last Transmission Information
DMI124 - Statistics Processing Other batch programs: (Specs not included in this package)
DMI090 - Report Extract
Report Programs

Program: DMI111
Jobname: DMI002
Desc: Move Transaction Activity to History Table
This program will copy the transaction activity to a history DB2 table based on criteria from the Set-up tables. If the transaction handle (DATED(THANDLE)) on the transaction activity table is less than or equal to the Deletion Date determined then it needs to be inserted to the transaction history table(DMIR0010_TNAHDLHIS) and deleted off the transaction activity table.(DMIR0000_TNA_HDL)

DB2 tables to include: DMIR0000_TNA_HDL, DMIR0010_TNAHDLHIS, DMIR0040_DMI_CTL, DMIR0220_DMI_TPCTL Include in your program IDATECOB. This subroutine handles date manipulation.
Perform Set-CTL-CSR
Perform Check-DMI-TPCTL for Nicknames
Perform Process-Remaining-Transactions

Set-CTL-CSR
Exec SQL
Declare ctl_csr cursor for
 Select NKN, DY_TNA_ONL
  from DMIR0220_DMI_TPCTL
End-Exec.
Check SQLCODE
Open ctl_csr
 Check_DMI_TPCTL
Exec SQL
Fetch ctl_csr into :WS-NKN, :WS-DAYS
end-exec.
Check SQLCODE
Perform Calculate_deletion_date
PERFORM while SQLCODE = 0

Exec SQL
Declare TRX_CSR cursor for
Select *
 from DMIR0000_TNA_HDL where (DATE(THANDLE) <= :WS-DELDT and
 NKN = :WS-NKN) for update
End-Exec.
Check SQLCODE

22

DMI111 Spec (Cont.)

Open TRX_CSR

Exec SQL
Fetch TRX_CSR into working storage fields
5   end-exec.
Check SQLCODE
Move SQLCODE to TRX_SQLCODE
PERFORM while TRX-SQLCODE = 0

Insert into DMIR0010_TNAHDLHIS(column names)
10     Values (Fields from DMIR000_TNA_HDL)
  Check SQLCODE
  Delete from DMIR0000_TNA_HDL
    where current of TRX_CSR
  Check SQLCODE
15   Exec SQL
  Fetch TRX_CSR into working storage fields
  end-exec.
  Check SQLCODE
  Move SQLCODE to TRX_SQLCODE
20 END-PERFORM while TRX_SQLCODE = 0

Exec SQL
Fetch ctl_csr into :WS-NKN, :WS-DAYS
end-exec.
Check SQLCODE
25 END-PERFORM while SQLCODE = 0
Close TRX_CSR
Close CTL_CSR

Process-Remaining-Transactions

Exec SQL
30  Select DY_TNA_ONL into :ws-days
   from DMIR0040_DMI_CTL
End-Exec.
Check SQLCODE

DMI111 Spec (Cont.)

```
        Perform Calculate_deletion_date
        Exec SQL
        Declare TRX_CSR cursor for
 5       Select*
          from DMIR0000_TNA_HDL A where (DATE(THANDLE) < = :WS-DELDT)
         and where not exists(select NKN from DMIR0220_DMI_TPCTL where NKN =
         A.NKN) for update
         End-Exec.
10      Check SQLCODE
        Open TRX_CSR Exec SQL
        Fetch TRX_CSR into working storage fields
        end-exec.
15      Check SQLCODE
        Move SQLCODE to TRX_SQLCODE
        PERFORM while TRX_SQLCODE = 0

Insert into DMIR0010_TNAHDLHIS(column names)
          Values (Fields from DMIR0000_TNA_HDL)
20       Check SQLCODE
         Delete from DMIR0000_TNA_HDL
           where current of TRX_CSR
         Check SQLCODE
         Exec SQL
25       Fetch TRX_CSR into working storage fields
         end-exec.
         Check SQLCODE
         Move SQLCODE to TRX_SQLCODE
         END-PERFORM 30      Close TRX_CSR
        Close CSR1
```

24

DMI111 Spec (Cont.)

Calculate-Deletion-Date
Accept ws-current-date from Date.
Convert current date to julian date(WS-JULDT) or use the IDATECOB routine to
get Date initially in the Julian date format.
Compute WS-DELTDT = WS-JULDT minus WS-DAYS
Reformat WS-DELDT into YYYY-MM-DD

25

Program: DM1112
Jobname: DMI003
Desc: Move History to Tape
This program will copy the history DB2 table(DMIR0010_TNAHDLHIS) to a flat file on tape
based on criteria from the Set-up tables(DMIR0040_DMI_CTL and DMIR0220_DMI_TPCTL).
If the transaction handle date(DATE(THANDLE)) is less than or equal to the deletion date
calculated then the record needs to be written to a flat file on tape(DISP=MOD) and deleted
from the DB2 table.

DB2 tables to include: DMIR0010_TNAHDLHIS, DMIR0040_DMI_CTL,
DMIR0220_DMI_TPCTL
*You will also need to define a flat file
Include in your program IDATECOB. This subroutine handles date
manipulation.

```
Open Flat file
Perform Check_DMI_TPCTL for Nicknames
Perform Process_Remaining_Transactions
```

Check_DMI_TPCTL
```
Exec SQL
Declare ctl_csr cursor for
 Select NKN, DY_TNA_ONL, DY_TNA_HIS
   from DMIR0220_DMI_TPCTL
End-Exec.
Check SQLCODE
Open ctl_csr Exec SQL
Fetch ctl_csr into :WS-NKN, :WS-DAYS, :WS-HIS-DAYS
end-exec.
Check SQLCODE
Perform Calculate_deletion_date
PERFORM while SQLCODE = 0

Exec SQL
  Declare TRX_CSR cursor for
  Select*
    from DMIR0010_TNAHDLHIS where (DATE(THANDLE) <= :WS-DELDT and
    NKN = :WS-NKN) for update
  End-Exec.
  Check SQLCODE
```

26

DMI112 Spec (Cont.)

Open TRX_CSR

Exec SQL
Fetch TRX_CSR into working storage fields
5    end-exec.
Check SQLCODE
Move SQLCODE to TRX_SQLCODE
PERFORM while TRX_SQLCODE = 0

Write to Flat File

10    Delete from DMIR0010_TNAHDLHIS
      where current of TRX_CSR
Check SQLCODE
Exec SQL
Fetch TRX_CSR into working storage fields
15    end-exec.
Check SQLCODE
Move SQLCODE to TRX_SQLCODE
END-PERFORM while TRX-SQLCODE = 0

Exec SQL
20    Fetch ctl_csr into :WS-NKN, :WS-DAYS, :WS-HIS-DAYS
end-exec.
Check SQLCODE
END-PERFORM
Close TRX_CSR
25    Close CTL_CSR

Process-Remaining-Transactions

Select DY_TNA_ONL, DY_TNA_HIS into :WS-DAYS, :WS-HIS-DAYS
   from DMIR0040_DMI_CTL
End-Exec.
30    Check SQLCODE
Open CSR1

27

DMI112 Spec (Cont.)

```
     Perform Calculate_deletion_date
     Exec SQL
     Declare TRX_CSR cursor for
 5    Select*
       from DMIR0010_TNA_HDL A where (DATE(THANDLE) < = :WS-DELDT) and
       where not exists (Select NKN from DMIR0220_DMI_TPCTL where NKN =
      A.NKN) for update
     End-Exec.
10   Check SQLCODE
     Open TRX_CSR Exec SQL
     Fetch TRX_CSR into working storage fields
     end-exec.
15   Check SQLCODE
     Move SQLCODE to TRX_SQLCODE
     PERFORM while TRX_SQLCODE = 0

Write to Flat file
      Delete from DMIR0010_TNAHDLHIS where current of TRX_CSR
20    Check SQLCODE
      Exec SQL
      Fetch TRX_CSR into working storage fields
      end-exec.
      Check SQLCODE
25    Move SQLCODE to TRX_SQLCODE
      END-PERFORM while TRX-SQLCODE = 0

Close TRX_CSR
     Close CSR1
```

28

DMI112 Spec (Cont.)

Calculate-Deletion-Date
Accept ws-current-date from Date.
Convert current date to julian date(WS-JULDT) or use the IDATECOB routine to
get Date initially in the Julian date format.
Compute WS-DELDT = WD-JULDT minus(WS-DAYS + WS-HIS-DAYS)
Reformat WS-DELDT into YYYY-MM-DD

PROGRAM: DMI113
Jobname: DMI004
Desc: Load Profile information from trading partners 20 File to system 10 DB2 tables. This program will read the vsam profile file. It will update trading partner, network and requestor profile tables based on the key to the file.

DB2 tables to include: DMIR0120_REQ_PRF, DMIR0080_EDINWCRG, DMIR0090_EDI_NTW, DMIR0048_TPCNT_TYP, DMIR0042_CNTPH_TYP, DMIR0130_TP_CNT, DMIR0180_TP_PRF, DMIR0040_DMI_CTL, DMI0150_TP_CNT_PH Also include DMITPVSM, the VSAM overlay include, in
DP.APPDEV3.PANVALET

**\*\*Note** - When inserting to tables, make sure all fields are initialized properly and always verify the insert worked correctly by checking your sqlcode.

Initialize Tables
Update Misc Tables
   Insert 'PN' and 'Phone number' to DMIR0042_CNTPH_TYP
   Insert 'FN' and 'Fax number' to DMIR0042_CNTPH_TYP
   Insert 'ON' and 'Other number' to DMIR0042_CNTPH_TYP
   Insert 'PM' and 'Primary' to DMIR0048_TPCNT_TYP
   Insert ' ', 01/01/0001, 0,0,'30' to DMIR0040_DMI_CTL
Logic Loop
   Open VSAM FileRead the VSAM file sequentially until EOF = YES
   If the key = NETPROF, Perform Insert_Network
   If the key = REQPROF, Perform Insert_Requestor
   If the key = TPPROF, Perform Insert_Trading_Partner

Insert_Network
   Insert the network id(DI-NET-PROFILE.DI-NETID) to table
   DMIR0080_EDINWCRG(NTW_ID)
   Check SQLCODE Insert the network id (DI-NET-PROFILE.DI-NETID) and network name (DI-NET-PROFILE.DI-NETNAME) to DMIR0090_EDI_NTW (NTW_ID, NTW_NM)
   Check SQLCODE DMI113 Spec (Cont.)

Insert_Requestor_Profile

Insert the requestor id (DI-REQ-PROFILE.DI-REQID), account number (DI-REQ-PROFILE.DI-REQ-ACCT) and user id (DI-REQ-USER) into
5   DMIR0120_REQ_PRF(REQ_ID, ACT_NR, USR_ID)
Check SQLCODE

Insert_Trading_Partner

Insert the tp nickname (DI-TP-PROFILE.DI-TP-NKN), network id (DI-TP-PROFILE.DI-TP- NETID), and TP company name (DI-TP-PROFILE.DI-TP-
10   CONM) to table DMIRO180_TP_PRF(NKN, NTW_ID, CO_NM)

If di-tp-ctc-name not = spaces
 Insert the tp nickname(DI-TP-PROFILE.DI-TP-NKN), contact type ('PM'), sequence number ('01'), contact name(DI-TP-PROFILE.DI-TP-CTC-NAME), address line 1(DI-TP-PROFILE.DI-TP-ADDR1), address line 2(DI-TP-
15   PROFILE.DI-TP-ADDR2) into table DMIR0130_TP_CNT(NKN, CNT_TYP_CD, SEQ_NR, CNT_NM, ADR_LN_1, ADR_LN_2)

If DI-TP-CTC-PHONE not = spaces
 Insert the tp nickname(DI-TP-PROFILE.DI-TP-NKN), contact type('PM'), sequence number ('01'), phone type ('PN'), and phone number (DI-TP-
20   PROFILE.DI-TP-CTC-PHONE) into table DMIR0150_TP_CNT_PH(NKN, CNT_TYP_CD, SEQ_NR, PH_TYP, PH_NR)

31

Program: DMI114
Jobname: DMI005
Desc: Load DI DB2 tables to system 10 DB2 tables
This program will read several DI DB2 tables and update the appropriate system 10 DB2 table.

5    DB2 tables to include: DMIR0100_MAP, DMIR0210_TPTNA_PRF,
EDIENU14.EDIVTPTX, EDIENU14.EDIVTPRT, EDIENU14.EDIVTPST \*\*Note - When inserting to tables, make sure all fields are initialized properly and always verify the insert worked correctly by checking your sqlcode.

Initialize tables
10    Update MAP Table
Update Application Table
Update Transaction Profile

Update Map Table
Declare EDI_CSR cursor for
15    Select TPTID, SENDRCV, STDID, TRNID from EDIENU14.EDIVTPTX
Check SQLCODE
Open EDI_CSR
Fetch EDI_CSR into :WS-TPTID, :WS-SENDRCV, :WS-STDID, :WS-TRNID
Perform while SQLCODE = 0

20    Insert the following information (WS-TPTID, WS-SENDRCV, WS-STDID, WS-TRNID) into
DMIR0100_MAP (MAP_ID, SND_OR_RECV, STD_ID,
STD_TNA_ID)
Perform Fetch-next-Map-Record
Check SQLCODE
25    End-Perform
Close EDI_CSR

Update Application Table

Open and declare a cursor to fetch from EDIENU14.EDIVTSAU

Insert the application id (APPLID from EDIENU14.EDIVTSAU) into table
30    DMIR0041_APP(APP_NM)

Close Cursor.

32

DMI114 Spec (Cont.)

Update Transaction Profile

- TRADING PARTNERS & MAP ID'S WITH TEST AND PRODUCTION
USAGE (RECEIVE)
```
5    SELECT A.TPNICKNM, A.TPTID, MIN(A.MEASDATE), MIN(B.MEASDATE)
     FROM EDIENU14.EDIVMRRT A
        ,EDIENU14.EDIVMRRT B
     WHERE A.TPNICKNM = B.TPNICKNM
     AND A.TPTID = B.TPTID
10   AND A.MEASID = 'CPTR'
     AND B.MEASID = 'CTTR'
     GROUP BY A.TPNICKNM, A.TPTID
```

UNION

- TRADING PARTNERS & MAP ID'S WITH TEST AND PRODUCTION
15 USAGE (SEND)
```
     SELECT C.TPNICKNM, A.TPTID, MIN(A.MEASDATE), MIN(B.MEASDATE)
     FROM EDIENU14.EDIVMRST A
        ,EDIENU14.EDIVMRST B
        ,EDIENU14.EDIVTPST C
20   WHERE A.INTPID = B.INTPID
     AND A.INTPID = C.INTPID
     AND A.ATFID = B.ATFID
     AND A.ATFID = C.ATFID
     AND A.TPTID = B.TPTID
25   AND A.TPTID = C.TPTID
     AND A.MEASID = 'CPTR'
     AND B.MEASID = 'CTTR'
     GROUP BY C.TPNICKNM, A.TPTID
```

UNION

33

DMI114 Spec (Cont.)

- TRADING PARTNERS/MAP ID'S WITH ONLY PRODUCTION USAGE (RECEIVE)

```
SELECT A.TPNICKNM, A.TPTID, MIN(A.MEASDATE), '00010101'
FROM EDIENU14.EDIVMRRT A
WHERE A.MEASID = 'CPTR'
 AND NOT EXISTS (SELECT * FROM EDIENU14.EDIVMRRT
       WHERE TPNICKNM = A.TPNICKNM
       AND TPTID = A.TPTID
       AND MEASID = 'CTTR')
GROUP BY A.TPNICKNM, A.TPTID
```

UNION

- TRADING PARTNERS/MAP ID'S WITH ONLY TEST USAGE (RECEIVE)

```
SELECT A.TPNICKNM, A.TPTID, '00010101', MIN(A.MEASDATE)
FROM EDIENU14.EDIVMRRT A
WHERE A.MEASID = 'CTTR'
 AND NOT EXISTS (SELECT * FROM EDIENU14.EDIVMRRT
       WHERE TPNICKNM = A.TPNICKNM
       AND TPTID = A.TPTID
       AND MEASID = 'CPTR')
GROUP BY A. TPNICKNM, A.TPTID
```

UNION

- TRADING PARTNERS/MAP ID'S WITH ONLY PRODUCTION USAGE (SEND)

```
SELECT B.TPNICKNM, A.TPTID, MIN(A.MEASDATE), '00010101'
FROM EDIENU14.EDIVMRST A
    ,EDIENU14.EDIVTPST B
WHERE A.INTPID = B.INTPID
 AND A.ATFID = B.ATFID
 AND A.TPTID = B.TPTID
 AND A.MEASID = 'CPTR'
 AND NOT EXISTS (SELECT * FROM EDIENU14.EDIVMRST C,
EDIENU14.EDIVTPST D
       WHERE C.INTPID = D.INTPID
```

34

DMI114 Spec (Cont.)

```
                AND C.ATFID   = D.ATFID
                AND C.TPTID   = D.TPTID
                AND D.TPNICKNM = B.TPNICKNM
                AND D.TPTID   = B.TPTID
                AND C.MEASID  = 'CTTR')
        GROUP BY B.TPNICKNM, A.TPTID

UNION

- TRADING PARTNERS/MAP ID'S WITH ONLY TEST USAGE (SEND)
        SELECT B.TPNICKNM, A.TPTID, '00010101', MIN(A.MEASDATE)
        FROM EDIENU14.EDIVMRST A
        ,EDIENU14.EDIVTPST B
        WHERE A.INTPID = B.INTPID
        AND A.ATFID   = B.ATFID
        AND A.TPTID   = B.TPTID
        AND A.MEASID  = 'CTTR'
        AND NOT EXISTS (SELECT * FROM EDIENU14.EDIVMRST C,
        EDIENU14.EDIVTPST D
                WHERE C.INTPID = D.INTPID
                AND C.ATFID   = D.ATFID
                AND C.TPTID   = D.TPTID
                AND D.TPNICKNM = B.TPNICKNM
                AND D.TPTID   = B.TPTID
                AND C. MEASID = 'CPTR')
        GROUP BY B.TPNICKNM, A.TPTID
        ORDER BY 1,2
```

35

Program: DMI115
Jobname: DMI006
Desc: Job to compare the trading partners 20 file to the system 10 DB2 Tables
This program will read the VSAM file sequentially and read the system 10 DB2
5    Tables to verify the data exists and is the same in system 10.
A report will need to be generated to display mismatched records.

DB2 tables to include: DMIR0180_TP_PRF, DMIR0130_TP_CNT,
DMIR0150_TP_CNT_PH, DMIR0120_REQ_PRF, DMIR0080_EDITWCRG,
DMIR0090_EDI_NTW, DMIR0040_DMI_CTL
10   ***Also define report record layout for mis-matched records
Also include DMITPVSM, the VSAM include, and IDATECOB, a common date
subroutine, from DP.APPDEV3.PANVALET.
**Note - When inserting to tables, make sure all fields are initialized properly
and always verify the insert worked correctly by checking your sqlcode.

15   Open VSAM file, Report File
Read the VSAM file sequentially until end of file
If the key = NETPROF, Perform Process_Network
If the key = REQPROF, Perform Process_Requestor
If the key = TPPROF, Perform Process_TP while Key = TPPROF 20   Process_Network
Declare NET_CSR Cursor for
 Select NTW_ID from DMIR0090_EDI_NTW for update
Open NET_CSR
Fetch NET_CSR into :WS-NET90

25   Perform while SQLCODE = 0 and key = NETPROF
IF DI-NETID = WS-NET90
  IF DI-NETNAME not = NTW_NM
    Update DMIR0090_EDI_NTW
     set NTW_NM = :DI-NETNAME
30      where NTW_ID = :DI-NETID
    Check SQLCODE
    call read_next_vsam_record
  call fetch_next_net90

DM1115(Cont.)

```
            else if DI-NETID > WS-NET90
                    Delete from DMIR0090_EDI_NTW where NTW_ID = :WS-NET90
                    Check SQLCODE
 5                  Delete from DMIR0080_EDITWCRG where NTW_ID = :WS-NET90
                    Check SQLCODE
                    call fetch_next_net90
            Else if DI-NETID < WS-NET90
             Insert the network id(DI-NET-PROFILE.DI-NETID, DI-NETNAME) to table
10              DMIR0090_EDI_NTW(NTW_ID, NTW_NM)
            Check SQLCODE
              call read_next_vsam_record
            end-perform
            Close NET_CSR 15      Process_Requestor
        Declare REQ_CSR cursor for
        Select REQ_ID,USR_ID, ACT_NR from DMIR0120_REQ_PRF for update
        Open REQ_CSR
        Fetch REQ_CSR into ws-req
20      Perform while sqlcode = 0 and key = 'REQPROF'
            IF DI-REQID = WS-REQ
              If DI-REQ-ACCT not = ACT_NR or DI-REQ-USER not = USR_ID
                update DMIR0120_REQ_PRF
                set act_nr= :DI-REQ-ACCT
25              set usr_id= :DI-REQ-USER
                where REQ_ID= :DI-REQID
              Check SQLCODE
            call read_next_vsam_record
            call fetch_next_requestor
30          else if DI-REQID > WS-REQ
                    Delete from DMIR0120_REQ_PRF where REQ_ID = :WS-REQ
                    Check SQLCODE
                    call fetch_next_requestor
            Else if DI-REQID < WS-REQ
35              Insert the requestor id (DI-REQ-PROFILE.DI-REQID), account number(DI-
            REQ-PROFILE.DI-REQ-ACCT) and user id (DI-REQ-USER) into
            DMIR0120_REQ_PRF(REQ_ID, ACT_NR, USR_ID)
              Check SQLCODE
            call read_next_vsam_record
40          end-perform
            Close REQ_CSR
```

37

DMI115(Cont.)

Process_Trading_Partner

```
       Declare TP_CSR cursor for
       Select NKN, NTW_ID, CO_NM from DMIR0180_TP_PRF where (DEL_FLG NOT
 5     = 'Y') for update
       Open TP_CSR
       Call Fetch_NEXT_TP
       IF DI-NKN = WS-NKN
          If DI-NETID not = NTW_ID or DI-CONM not = CO_NM
10           update DMIR0180_TP_PRF
                set ntw_id= :DI-NETID
                set co_nm= :DI-CONM
                where NKN= :DI-NKN
             check SQLCODE
15        end-if
          if di-tp-ctc-name not = spaces
             perform process-contact
          end-if
          call read_next_vsam_record
20        call fetch_next_TP
       else if DI-NKN > WS-NKN
                Perform Calculate-Delete-Date
          Move 'Y' to the DEL_FLG, move current date to INA_DT(Inactive Date) and
          move WS-DELDT to DEL_DT and update DMIR0180_TP_PRF
25     **NOTE - This trading partner and all associated records will get deleted in the
       purge job Check SQLCODE
             call fetch_next_TP
       Else if DI-NKN < WS-NKN 30              Insert the tp nickname (DI-TP-PROFILE.DI-TP-NKN), network id (DI-
       TP-PROFILE.DI-TP-NETID), and TP company name(DI-TP-PROFILE.DI-TP-
       CONM) to table DMIR0180_TP_PRF(NKN, NTW_ID, CO_NM)
             Check SQLCODE
             if di-tp-ctc-name not = spaces
35        perform process-contact
          end-if
       call read_next_vsam_record
       end-perform
       Close TP_CSR
```

38

DMI115 (Cont.)

Process-Contact
Select NKN, CNT_TYP_CD,SEQ_NR, CNT_NM, ADR_LN_1, ADR_LN_2
into :WS-NKN, :WS-CNTTYP, :WS-SEQNR, :WS-CNTNM, :WS-ADR1, :WS-
ADR2 from DMIR0130_TP_CNT where NKN = :DI-TP-NKN and CNT_TYP_CD =
"PM" and SEQ_NR = '01'

If SQLCODE = +100
    Insert the tp nickname(DI-TP-PROFILE.DI-TP-NKN), contact type ('PM'),
sequence number('01'), contact name(DI-TP-PROFILE.DI-TP-CTC-NAME),
address line 1(DI-TP-PROFILE.DI-TP-ADDR1), address line 2(DI-TP-
PROFILE.DI-TP-ADDR2) into table DMIR0130_TP_CNT(NKN, CNT_TYP_CD,
SEQ_NR, CNT_NM, ADR_LN_1, ADR_LN_2)

Else if SQLCODE = 0
    If the CNT_NM not = DI-TP-CTC-NAME or ADR_LN_1 not = DI-TP-
ADDR1 or ADR_LN_2 not = DI-TP-ADDR2
      then Update DMIR0130_TP_CNT with the new values for these fields
from the DI-TP-PROFILE If DI-TP-CTC-PHONE not = spaces
    Select PH_NR into :WS-PHNR from DMIR0150_TP_CNT_PH where
NKN = DI-TP-NKN and CNT_TYP_CD = 'PM' and SEQ_NR = '01'

If SQLCODE = +100
Insert the tp nickname(DI-TP-PROFILE.DI-TP-NKN), contact type('PM'),
sequence number ('01'), phone type ('PN'), and phone number (DI-TP-
PROFILE.DI-TP-CTC-PHONE) into table DMIR0150_TP_CNT_PH(NKN,
CNR_TYP_CD, SEQ_NR, PH_TYP, PH_NR)

Else if SQLCODE = 0
    if the PH_NR not = DI-DP-CTC-PHONE
      then Update DMIR0150_TP_CNT_PH with the DI-TP-CTC-PHONE

39

DMI115(Cont.)

Calculate-Delete-Date
Select DY_TP_PRF into :WS-DAYS from DMIR0220_DMI_TPCTL where NKN = :WS-NKN
5   If SQLCODE = +100
    Select DY_TP_PRG into :WS-DAYS from DMIR0040_DMI_CTL
    end-if
    Convert current date to Julian Date using the IDATECOB Include logic from DP.APPDEV3.PANVALET
10  Add DY-TP-PRG to WS-JULDT
    Convert the result to YYYY-MM-DD to get WS-DELDT

40

Program: DMI116
Jobname: DMI007
Desc: Job to compare the DI DB2 Tables to the system 10 DB2 Tables
This program will read the DI DB2 Tables and verify the data exists and is the
same id system 10.
A report will need to be generated to display mismatched records.

DB2 tables to include: DMIR0100_MAP, DMIR0210_TPTNA_PRF,
EDIENU14.EDIVTPTX, EDIENU14.EDIVTSAU, EDIENU14.EDIVTPRT,
EDIENU14.EDIVTPST Also include IDATECOB, a common date subroutine, from
DP.APPDEV3.PANVALET.
**\*\*Note** - When inserting to tables, make sure all fields are initialized properly
and always verify the insert worked correctly by checking you sqlcode.

Perform Compare-Map-Tables
Perform Compare-Applid-Tables (In Future Release)
Perform Compare-Trans-Profile-Tables

Compare-Map-Table
Declare EDI_CSR cursor for
Select TPTID, SENDRCV, STDID, TRNID from EDIENU14.EDIVTPTX A where
not exists in (Select MAP_ID from DMIR0100_MAP B where B.MAP_ID =
A.TPTID)

Fetch EDI_CSR into :WS-TPTID, :WS-SENDRCV, :WS-STDID, :WS-TRNID
Check SQLCODE
Perform while SQLCODE = 0
Insert the following information (TPTID, SENDRCV, STDID, TRNID from
EDIENU14.EDIVTPTX) into DMIR0100_MAP (MAP_ID, SND_OR_RECV,
STD_ID, STD_TNA_ID)
Check SQLCODE
Fetch another row using EDI_CSR
End-Perform
Close EDI_CSR

41

DMI116(Cont.)

Declare MAP_CSR cursor for
 Select A.TPTID, A.SENDRCV, A.STDID, A.TRNID, B.MAP_ID,
 B.SND_OR_RECV, B.STD_ID, B.STD_TNA_ID from
5 EDIENU14.EDIVTPTX A, DMIR0100_MAP B where(A.TPTID=B.MAP_ID) and
 where(A.SENDRCV not = B.SND_OR_RECV or A.STDID not = B.STD_ID or
 A.TRNID not = B.STD_TNA_ID) for update Open Map_CSR
Fetch Map_CSR into Working Storage Fields
10 Update DMIR0100_MAP using fields from EDIENU14.EDIVTPTX Close MAP_CSR

Compare-Applid-Tables - In Future Release

Open and declare a cursor to fetch from EDIENU14.EDIVTSAU

Select APPLID into :WS-APPLID from EDIENU14.EDIVTSAU where APPLID not
15 in (select APP_NM into :WS-DMI-APPLID from DMIR0041_APP)

Insert the application id (APPLID from EDIENU14.EDIVTSAU) into table
DMIR0041_APP(APP_NM)

\*\*NOTE - After processing is complete, close cursor

Compare-Trans-Profile-Tables

20 Select Max(PRD_STR_DT), MAX(TST_STR_DT) into :WS-PRDDT, :WS-TSTDT
 from DMIR0210_TPTNA_PRF
 Check SQLCODE
 If WS-PRDDT > WS-TSTDT
  move WS-PRDDT to WS-LSTDT
25 Else move WS-TSTDT to WS-LSTDT \*\*\*See Load-Trans-Profile-Table Logic in DMI114 Spec for query logic

42

DMI116(Cont.)

Process Add Logic First -
Declare DI_CSR Cursor for
Select TPNICKNM, TPTID from EDIENU14.EDIVTPRT where not exists in
5 (Select NKN, MAP_ID from DMIR0210_TPTNA_PRF where NKN = TPNICKNM
and MAP_ID = TPTID)
Fetch
Insert these records to DMIR0210_TPTNA_PRF using default dates of 0001-
01-01 for the dates
10 Close DI_CSR Process Update Logic Second -
Declare DI_UPDTCSR cursor for
Union on EDIENU14.EDIMRST and EDIEUN14.EDIMRRT where Measdt > =
WS-LSTDT (Also need to join MRST and TPST to get NKN - refer to DMI114
15 Spec)
Fetch DI_UPDTCSR and Process while SQLCODE = 0
Update DMIR0210
Close DI_UPDTCSR Process Delete Logic Last
20 Declare DI_DELCSR cursor for
Select NKN, MAP_ID from DMIR0210_TPTNA_PRF where not exists in(Select
TPNICKNM, TPTID from EDIENU14.EDIVTPRT where NKN = TPNICKNM and
MAP_ID = TPTID)
Union
25 Select NKN, MAP_ID from DMIR0210_TPTNA_PRF where not exists in(Selec
TPNICKNM, TPTID from EDIENU14.EDIVTPST where NKN = TPNICKNM and
MAP_ID = TPTID)
Fetch DI_DELCSR & process while SQLCODE = 0
Delete these records from DMIR0210_TPTNA_PRF

43

Program: DMI117
Jobname: DMI008
Desc: Transaction Activity Extract
DMI008 will contain multiple steps. The first step will execute the DI commands
that will extract the file from DI. The second step will execute DMI117. This
program will read the flat file generated from the first step and reformat it and
insert it into DMIR0000_TNA_HDL within system 10. ****The PERFORM
UPDATE STATISTICS should be run before this job!!!!

DB2 tables to include: DMIR0000_TNA_HDL

Also set up an include with the flat file overlay that is extract from trading partner 20.

Also include IDATECOB, a common date subroutine, from
DP.APPDEV3.PANVALET.
**Note - When inserting to tables, make sure all fields are initialized properly
and always verify the insert worked correctly by checking your sqlcode.

Trading partners 20 Commands to go in step 1 of JCL
*For testing purposes*
Perform Remove TRX where TRXSTAT('61')
Perform Transaction data extract selecting
    Transaction(YES) sendackdata(YES) receivackdata(YES)
    where STSTAT('4') where STSTAT('1')
*For production*
 Perform Remove TRX where TRXSTAT('61')
 Perform Remove & Extract selecting
    Transaction(YES) sendackdata(YES) receivackdata(YES)

This will provide you with a flat file (See attached overlay) that you will need
to load into DMIR0000_TNA_HDL. If the Acknowledgement received is not blank,
look at the 2nd T record and pull transaction status to get the Functional
Acknowledgement status.

Insert into DMIR0000_TNA_HDL using values from the flat file

44

Program: DMI122
Jobname: DMI009
Desc: Trading Partner Purge
This program will read DMIR0180_TP_PRF and if the delete flag is set to 'Y' and
5     the deletion date is < = to current date then the trading partner and all associated
rows on other tables with trading partner nickname as the key will be deleted.
Also the API will be used to check the trading partners 20 file to see if the record still exists
in DataInterchange. If it does, it will be deleted there as well as other records in
trading partners 20 for this trading partner.

10    DB2 tables to include: DMIR0180_TP_PRF, DMIR0210_TPTNA_PRF,
DMIR0000_TNA_HDL, DMIR0020_LST_TMT, DMIR0030_TNA_SMA,
DMIR0130_TP_CNT, DMIR0140_TP_CNT_CM, DMIR0150_TP_CNT_PH,
DMIR0160_TP_ALT_ID, DMIR0170_TP_NTLG, DMIR0010_TNAHDLHIS,
DMIR0220_DMI_TPCTL, EDIENU14.EDIVTPST, EDIENU14.EDIVTPRT 15    **Also include DMITPVSM, the VSAM file overlay, and IDATECOB, a common
date subroutine, from DP.APPDEV3.PANVALET.

Using IDATECOB routine, get current date in 01/01/1993 format
Open cursor
Declare TP_CSR cursor for
20    Select * from DMIR0180_TP_PRF where Del_FLG = 'Y' and DEL_DT < =
Current_date for update
Loop - Perform until SQLCODE = +100
Perform Fetch-TP-Flagged
Perform Delete-system 10-TP
25    Perform Delete-trading partners 20-TP
Write record to report of trading partner deleted
End-Loop
Write report

Fetch-TP-Flagged
30    Fetch TP_CSR into :Save-NKN
Check SQLCODE
Move report information to report fields

45

DM122(Cont.)

Delete-system 10-TP

```
        Delete from DMIR0180_TP_PRF where NKN=:Save-NKN
        Check SQLCODE.
 5      Delete from DMIR0210_TPTNA_PRF where NKN=:Save-NKN
        Check SQLCODE.
        Delete from DMIR0000_TNA_HDL where NKN=:Save-NKN
        Check SQLCODE.
        Delete from DMIR0020_LST_TMT where NKN=:Save-NKN
10      Check SQLCODE.
        Delete from DMIR0030_TNA_SMA where NKN=:Save-NKN
        Check SQLCODE.
        Delete from DMIR0130_TP_CNT where NKN=:Save-NKN
        Check SQLCODE.
15      Delete from DMIR0140_TP_CNT_CM where NKN=:Save-NKN
        Check SQLCODE.
        Delete from DMIR0150_TP_CNT_PH where NKN=:Save-NKN
        Check SQLCODE.
        Delete from DMIR0160_TP_ALT_ID where NKN=:save-NKN
20      Check SQLCODE.
        Delete from DMIR0170_TP_NTLG where NKN=:Save-NKN
        Check SQLCODE.
        Delete from DMIR0010_TNAHDLHIS where NKN=:save-NKN
        Check SQLCODE.
25      Delete from DMIR0220_DMI_TPCTL where NKN=:save-nkn
        Check SQLCODE.
```

Delete-trading partners 20-TP

Using the API verify that Save-NKN does not exist on the VSAM file

If it does, use the API to delete it from the VSAM profile file as well as from the
30      EDIENU14.EDIVTPRT and EDIENU14.EDIVTPST DB2 Tables.

46

Program: DM1123
Jobname: DMI008
Desc: Update Last Transmission
This program will update the last transmission information that is kept on table
DMIR0020_LST_TMT. This job needs to run after program DMI117 and after job
DMI007.

DB2 tables to include: DMIR0020_LST_TMT, EDIENU14.EDIVTSTU,
EDIENU14.EDIVTSEV, EDIENU14.EDIVTSTH \*\*Also include IDATECOB, a common date subroutine, from
DP.APPDEV3.PANVALET.

Perform Calculate-Last-Date-Run
Perform Process-Transaction-Activity

Calculate-Last-Date-Run

Select Max(LST_TMT_DT) into :WS-LSTDT from DMIR0020_LST_TMT
Check SQLCODE

Process-Transaction-Activity

Declare csr1 cursor for
   Select A.TPNICKNM, A.ATFID, B.INTCTLNO, B.GRPCTLNO,
B.TRNCTLNO, C.ENVSNDAT from EDIENU14.EDIVTSTH A,
EDIENU14.EDIVTSTU B, EDIENU14.EDIVTSEV C where (A.THANDLE =
B.THANDLE) and where (B.TPNICKNM = C.TPNICKNM and B.DIREC =
C.DIREC and B.INTCTLNO = C.INTCTLNO and B.RECVERID = C.RECVERID)
and where(DATE(C.ENVSNDAT > = :WS-LSTDT))
Check SQLCODE

47

DMI23(Cont.)

```
    Open CSR1
    Fetch CSR1 into :WS-NKN, :WS-MAPID, :WS-INTCTL, :WS-GRPCTL, :WS-
    TRNCTL, :WS-SNDDT
5   Perform while SQLCODE = 0
      Select LST_GRP_CTL_NR,
             LST_ITC_CTL_NR,
             LST_TNA_CTL_NR,
             LST_TMT_DT
10    Into  :WS-LSTGRP,:WS-LSTCTL,:WS-LSTTNA,:WS-TMTDT
      From DMIR0020_LST_TMT where (NKN = :WS-NKN and MAP-ID = :WS-
    MAPID) for update
      Check SQLCODE
      If SQLCODE = 0
15      Update DMIR0020_LST_TMT
          set LST_GRP_CTL_NR = :WS-GRPCTL,
              LST_ITC_CTL_NR = :WS-INTCTL,
              LST_TNA_CTL_NR = :WS-TRNCTL,
              LST_TMT_DT = :WS-SNDDT
20        where NKN = :WS-NKN and MAP-ID = :WS-MAPID IF SQLCODE = +100
        Insert into DMIR0020_LST_TMT using WS-NKN, WS-MAPID, WS-
    GRPCTL, WS-INTCTL, WS-TRNCTL, WS-SNDDT Perform Fetch-Next-Record
25  End-Perform
```

48

Program: DMI124
Jobname: DMI010
Desc: Update Statistics
This program will update the statistics information that is kept on table
5    DMIR0030_TNA_SM. This job will be run during month-end processing.

DB2 tables to include: DMIR0030_LST_TMT, EDIENU14.EDIVMRRT, EDIENU14.EDIVMRST, EDIENU14.EDIVTPST \*\*Also include IDATECOB, a common date subroutine, from
DP.APPDEV3.PANVALET.

10    Perform Initialize
Perform Update-DMIR0030
Close EDI_CSR

Initialize

Declare EDI_CSR cursor for
15    Select A.TPNICKNM, A.TPTID, SUM(A.TRXCOUNT), SUM(B.TRXCOUNT) from EDIENU14.EDIVMRRT A
EDIENU14.EDIVMRRT B Where
((A.MEASID = 'DPTR' and B.MEASID = 'DTTR' and A.MEASDATE in between (:WS-DATE-FROM :WS-DATE-TO) and B.MEASDATE in between (:WS-DATE-
20    FROM :WS-DATE-TO))
UNION
Select C.TPNICKNM, D.TPTID, SUM(D.TRXCOUNT), SUM(E.TRXCOUNT) from EDIENU14.EDIVTPST C,
EDIENU14.EDIVMRST D,
25    EDIENU14.EDIVMRST E where
((C.INTPID = D.INTPID and C.ATFID = D.ATFID and C.TPTID = D.TPTID and D.MEASID = 'DPTR' and E.MEASID = 'DTTR' and D.MEASDATE in between (:WS-DATE-FROM :WS-DATE-TO) and E.MEASDATE in between (:WS-DATE-FROM :WS-DATE-TO))

30    Check SQLCODE
Open EDI_CSR

49

DMI24(Cont.)

Update-DMIR0030

Fetch EDI_CSR into :WS-TPNICKNM, :WS-TPTID, :WS-PRDCNT, :WS-TSTCNT
5   Check SQLCODE Perform while SQLCODE = 0

Select NKN, MAP_ID, YR, MTH, PRD_TNA_CT, TST_TNA_CT into Working Storage Fields from DMIR0030_TNA_SM where(NKN = :WS-TPNICKNM and MAP_ID = :WS-TPTID and YR = :WS-YEAR-SELECTED and MTH = :WS-
10  MONTH-SELECTED) for UPDATE Check SQLCODE
  If SQLCODE = +100
    Insert into DMIR0030_TNA_SM using values (:WS-TPNICKNM, :WS-TPTID, :WS-YEAR-SELECTED, :WS-MONTH-SELECTED, :WS-PRDCNT, :WS-
15  TSTCNT)
    Check SQLCODE
    Perform Process-Total-Record
  Else If SQLCODE = 0
    Update DMIR0030_TNA_SM
20     set PRD_TNA_CT = :WS-PRDCNT,
        TST_TNA_CT = :WS-TSTCNT
     where (NKN = :WS-TPNICKNM and MAP_ID = :WS-TPTID and YR = :WS-YEAR-SELECTED and MTH = :WS-MONTH-SELECTED)
    Check SQLCODE
25    Perform Process-Total-Record
  END-IF
  END-IF Fetch another record
  End-Perform

50

DMI24(Cont.)

Process-Total-Record

```
    Select PRD_TNA_CT, TST_TNA_CT into :WS-TOT-PRD, WS-TOT-TST from
    DMIR0030_TNA_SM where(YR = '0001' and MTH = '01' and NKN = :WS-
5   TPNICKNM and MAP_ID = :WS-TPTID)

Check SQLCODE
    If SQLCODE = +100
      Insert into DMIR0030_TNA_SM using values(:WS-TPNICKNM, :WS-TPTID,
    '0001', '01', :WS-PRDCNT, :WS-TSTCNT)
10  Else if SQLCODE = 0
      Compute WS-TOT-PRD = PRD-TNA-CT + WS-PRDCNT
      Compute WS-TOT-TST = TST-TNA-CT + WS-TSTCNT
      Update DMIR0030_TNA_SM
        Set PRD_TNA_CT = :WS-TOT-PRD,
15          TST_TNA_CT = :WS-TOT-TST
        where (NKN = :WS-TPNICKNM and MAP_ID = :WS-TPTID and YR = '0001'
    and MTH = '01')
```

In the above detailed description, one of the preferred embodiments of the present invention is described. It is to be clearly understood that other embodiments may be utilized and changes may be made to both the method and system without departing from the true scope of the present invention.

What is claimed is:

1. A method of managing the electronic data interchange between trading partners comprising the steps of:

a) selecting at least one of a plurality of processing menus including at least one managing trading partner menu, one query trading partner menu, a monitored transaction activity menu, a display statistics menu, an update internal information menu, a set-up and maintain menu and a return report menu;

b) selecting at least one of the processing menus wherein the managing trading partner menu includes at least a viewing trading partner profiles, updating trading partner profiles, adding or copying trading partner profiles, viewing trading partner point of contacts, updating trading partner point of contacts, adding a point of contact for trading partners, viewing all map I.D.'s for a trading partner and viewing trading partner map I.D. profiles; wherein a space is provided for providing a trading partner names, and point of contact names, point of contact type and map I.D.'s and further wherein the query trading partner menu permits the additional options of viewing all trading partners by alphabetical order, by transaction I.D. and direction, by network I.D., by map I.D. and by test production status; and wherein the transaction activity menu further provides the options of viewing information by data only, by trading partner and dates, by transaction I.D. and direction of date, by document number and date, by transaction status, and date and by control numbers and date;

c) entering at least one of a plurality of commands to initiate the processing of data;

d) processing the data based on the commands entered;

e) entering at least one of a plurality of commands for selecting an output option;

f) entering at least one of a plurality of commands for providing a visual presentation based on the selected output option; and g) providing the visual presentation based on the commands selected.

2. The method in accordance with claim 1 wherein the statistics menu provides the further options of displaying volume information by date, by document I.D., by trading partner and date, by transaction and date and by transaction activity graph by trading partner.

3. The method in accordance with claim 1 wherein the internal information menu provides the further options of displaying information by trading partner and analysis, by map I.D. analysis, by internal mailbox, by networks, and by updating network contact information.

4. The method in accordance with claim 1 wherein the setup menu maintained on the screen further provides the options of submitting report requests, administering company types, authorizing user tables, maintaining country codes, maintaining internal I.D. type codes, maintaining mailboxes, maintaining map information, maintaining network charge tables, organizing the relationship, maintaining phone-type codes, maintaining state province code, maintaining trading partner point of contact type codes, maintaining transaction I.D. tables, maintaining transaction status tables, set-up criteria and default trading partner criteria.

* * * * *